United States Patent [19]

Clemens et al.

[11] 3,965,021

[45] June 22, 1976

[54] ELECTROSTATOGRAPHIC TONERS USING BLOCK COPOLYMERS

[75] Inventors: Carl F. Clemens, Webster; M. James Lenhard, Rochester, both of N.Y.

[73] Assignee: Xerox Corporation, Stamford, Conn.

[22] Filed: Sept. 15, 1970

[21] Appl. No.: 72,548

Related U.S. Application Data

[63] Continuation-in-part of Ser. No. 524,371, Jan. 14, 1966, abandoned.

[52] U.S. Cl. .......................... 252/62.1 P; 260/885; 260/886
[51] Int. Cl.² .......................................... G03G 9/00
[58] Field of Search ............ 252/62.1; 260/885, 886

[56] References Cited
UNITED STATES PATENTS

| | | | |
|---|---|---|---|
| 2,297,691 | 10/1942 | Carlson | 252/62.1 |
| 2,377,231 | 5/1945 | Hayes | 18/55 |
| 2,638,416 | 5/1953 | Walkup | 252/62.1 |
| 2,788,288 | 4/1957 | Rheinfrank | 252/62.1 |
| 2,954,358 | 9/1960 | Hurwitz | 260/885 |
| 3,107,169 | 10/1963 | Bornarth | 252/62.1 |
| 3,137,663 | 6/1964 | Muller et al. | 260/885 |
| 3,144,429 | 8/1964 | Strobel | 260/886 |
| 3,189,664 | 6/1965 | Nozaki | 260/886 |
| 3,236,776 | 2/1966 | Tomanek | 252/62.1 |
| 3,239,465 | 3/1966 | Rheinfrank | 252/62.1 |
| 3,262,806 | 7/1966 | Gourge | 252/62.1 |
| 3,317,635 | 5/1967 | Osmond et al. | 260/881 |
| 3,391,082 | 7/1968 | Maclay | 252/62.1 |
| 3,422,049 | 1/1969 | McClain | 252/62.1 |
| 3,501,582 | 3/1970 | Clemens et al. | 252/62.1 |

OTHER PUBLICATIONS

Banfort et al., *Nature*, vol. 176, 7/55, p. 78.
Maxwell, "Modifying Polymer Properties Mechanically", Polymer Proceeding, No. 49, vol. 60, 1964, pp. 10–16, Am. Inst. of Ch. Engineers, N.Y.

*Primary Examiner*—Jack P. Brammer
*Attorney, Agent, or Firm*—J. J. Ralabate; D. C. Kolasch; A. W. Karambelas

[57] ABSTRACT

Toner for use in the development of latent electrostatic images comprised of a resinous material and a colorant in which the resinous material is comprised of at least two polymers, the first of which has a glass transition temperature of at least 20°C., and the second of which has a glass transition temperature of at least 5°C. lower than the glass transition of the first. The polyblend is either a graft or block copolymer comprised of the aforesaid polymers, or a physical blend of such polymers which are incompatible with each other, prepared by dissolving the polymers in a common solvent in which the polymers are about equally soluble, followed by vigorous agitation and removal of the solvent to provide an incompatible solid mixture of the polymer.

6 Claims, No Drawings

ELECTROSTATOGRAPHIC TONERS USING BLOCK COPOLYMERS

This application is a continuation-in-part of U.S. Ser. No. 524,371, filed on Jan. 14, 1966, now abandoned.

This invention relates in general to electrostatography and in particular to electrostatographic developing materials and methods for their production and use.

Electrostatography is perhaps best exemplified by the process of xerography as first described in U.S. Pat. No. 2,297,691 to C. F. Carlson. In this process, a photoconductor is first given a uniform electrostatic charge over its surface and is then exposed to an image of activating electromagnetic radiation which selectively dissipates the charge in illumninated areas of the photoconductor, while the charge in non-illuminated areas is retained, thereby forming a latent electrostatic image. This latent image is then developed or made visible by the deposition of finely divided electrostatic marking material, referred to in the art as toner, on the surface of the photoconductor so that the marking material conforms to the pattern of the latent electrostatic image. This visible image may then be utilized in a number of diverse ways. For example, the image may be viewed in situ on the photoconductive insulator, fixed in place on the photoconductive insulator or transferred to a second surface such as a sheet of paper and fixed in placed thereon as desired. Generally, this selection is dictated by whether or not the photoconductive insulating material is reuable as is the case with amorphous selenium or non-reusable as is the case with particulate zinc oxide – binder film types of binder plates. Since fixing is generally achieved by heat fusing the particles or by contacting them with a liquid or a vapor of a material which is at least a partial solvent for one component of the particle, the particles generally include a resinous component such as a polymer along with a colorant such as a dye, pigment or combination of the two.

Although the original Carlson patent described development of the electrostatic image by merely dusting it with various powders such as lycopodium, gum copal, powdered dyes and the like, many other developing techniques have been devised since that time to produce more effective and higher speed development. Some of these techniques include brush development as described in U.S. Pat. No. 3,015,305 to Hall, powder cloud development as described in U.S. Pat. No. 2,918,900 to Carlson, loop development as described in U.S. Pat. No. 2,761,416 to Carlson and doner development as described un U.S. Pat. No. 2,895,847 to Mayo. However, it is more than likely that the commercial xerographic development technique most widely used today is the technique known as cascade development which is described in U.S. Pat. No. 2,618,552 to Wise. A general purpose office copying machine incorporating this development technique is described in U.S. Pat. No. 3,099,943. As the cascade technique is generally carried out in commercial apparatus, a developer mixture composed of relatively large carrier beads, each having a multiplicity of much smaller toner particles adhering electrostatically to its surface is provided in a trough or sump. Small buckets on an endless belt conveyor scoop this developing mixture from the sump, convey it to a point above the latent electrostatic image on the xerographic plate and dump it down over the plate so that it cascades or rolls by gravity across this image-bearing surface. As this occurs, the latent electrostatic image picks toner particles off the carrier beads and they adhere to the latent image so as to develop it. The carrier beads along with any unused toner particles then return to the sump for recycling through the developing system. Small amounts of toner are periodically added to the developing mixture to compensate for the toner depleted by development. This process is then repeated for each copy which the machine produces and is ordinarily repeated many thousands of times during the usable life of the developer.

In this development process then as can be seen from the description given above as well as in other development techniques, the toner is subjected to mechanical attrition which tends to break down the particles into dust fines or form film on the xerographic drum or the carrier particles or cause the particles to agglomerate together. This, of course, occurs as a result of shear and impact forces due to the falling of the developer on the xerographic plate and the movement of the bucket conveyor through the sump of developer material.

In view of the mechanical abuse suffered by toner when it is used in the various developing processes, it is desirable to have a tough material to withstand the applied forces. On the other hand, it is desirable to have a soft material so that it can be heat fused more readily at lower temperatures than can be achieved with the tougher material. This same conflict in materials requirements also exists in the toner manufacturing process. For example, in one conventional technique for toner manufacture, the resin and colorants are measured out in the proper proportions and then masticated into a coherent mass and heated and further blended on a rubber mill followed by cooling, crushing and further particle size reduction by fluidized grinding or the like. Of course, it is quite important that uniformity be attained in the components of the blends so that the small toner particles which are finally produced are the same, rather than having particles some of which contain all colorant or all one resin or another resin. The amount of uniformity which can be attained in a mixture is a function of the work or shear which can be added to the system during mixing and this in turn in primarily a function of the toughness of the polymeric components in the mix. The tougher these components, the greater the amount of shear or work that can be added to the system. Thus, from the view of blending, tough polymers are most desirable. On the other hand, in the final fluidized grinding process it has been found that brittle polymers are most desirable since they exhibit the greatest degree of frangibility so that particle size reduction can be carried out inexpensively and rapidly whereas in some extreme cases it has been found that with the tougher polymers, paticle size reduction does not even occur in some grinders and in other situations, it only occurs at very slow rates and very high power inputs.

Accordingly, it is an objective of this invention to provide high quality electrostatic developers capable of producing sharp, high resolution images.

It is a further objective of this invention to provide electrostatographic toners exhibiting extreme toughness and resistance to mechanical attrition during the development process.

A still further object of this invention is to provide an electrostatographic toner which can be heat fused to paper or other substrates at a fast rate and low temperature.

Yet another objective of this invention is to provide an electrostatographic toner in which the components can be easily blended to a very high degree of uniformity and easily produced in a uniform fine particle size.

Another object of this invention is to provide an electrostatographic toner which is sufficiently frangible so that it can be readily broken up at a fast rate with relatively low power input during the manufacturing process.

Still another object of the invention is to provide a novel method of manufacturing electrostatographic toner.

The objects of this invention are accomplished by providing a toner comprises of a colorant and a resinous material in which the resinous material is a polyblend of at least two polymers, the first one of which has a glass transition temperature of at least 20°C., and the second of which has a glass transition temperature which is at least 5°C. lower than the glass transition temperature of the first polymer. The polyblend may be either (1) a physical mixture of two incompatible polymers having the aforementioned glass transition temperature relationship formed by dissolving both polymers in a common solvent in which they are both about equally soluble, followed by vigorous agitation and removal of the solvent to provide an incompatible solid mixture of the two polymers; or (2) a chemical mixture of at least two such polymers; namely, either a block copolymer or a graft copolymer. In this manner, each of the polymeric components of the polyblend retains its own identity in the polyblend, whereby the polyblend incorporates the desirable property of each component. It is to be understood that although the polyblend is discussed in the terms of two polymer components, the polyblend may include three or more components. It is further to be understood each of the polymer components of the polyblend may be either a homopolymer or a copolymer and the copolymer may be formed from two or more monomers. The term polymer includes such hompolymers and copolymers.

In preparing the physical polyblend, the two polymeric components must be incompatible with each other; i.e., the two polymeric components have at most a low degree of solubility in each other so that each component retains its own identity in the final product. If compatible polymers or resins are employed in preparing the physical polyblend, they dissolve one in the other, and an end product in producing having properties which are an average of the two starting materials. Incompatible resins, even when physically blended in accordance with the invention, do not undergo the averaging process, and the finely divided toner particles ultimately produced from the polyblend possess two distinct and discrete resin properties corresponding to the properties of the respective components, instead of an average set of properties as with physical polyblends formed from compatible polymers.

The polyblends which are either a graft or block copolymer have relatively long chains of each polymeric component (the graft polymer having a backbone of one polymeric component and a sidechain of the other, and a block copolymer having blocks of each polymer in the chain) and, therefore, each polymeric component retains its own identity. The use of block or graft copolymers as the polyblend from which the toner is formed is particularly preferred in that there is no necessity to form a physical blend of two polymeric components, with the only blending required being the blending required to disperse a colorant either a dye, pigment or mixture thereof through the polymer prior to the formation of the small toner particles.

The polymeric components of the polyblend may be natural resins, modified natural resins or synthetic resins which are prepared by addition, condensation or any other technique. The polyblend may be comprised of any combination of natural resins, modified resins or synthetic resins having the hereinabove noted properties. As representative examples of natural and modified natural resins which may be employed to form the polyblend, there may be mentioned ethyl cellulose, cellulose acetate, cellulose nitrate, gum nitrate, gum copal, gum sandarac, rosin, oxidized rosin, ethylene glycol and pentaerythritol esters of rosin and hydrogenated and partially hydrogenated forms of these esters, waxes, fossil resins such as asphalt, protein resins such as zein, other vegetable resins such as pitch, dragons blood and the like. As representative examples of synthetic resins which may be employed as the polymeric components of the polyblend, there may be mentioned polymers made from any one or more of the following exemplary monomers: acrylic and methacrylic acids, alkyl acrylates and methacrylates, haloacrylates, diethyl maleate and mixtures thereof, vinyl and vinylidene halides such as vinyl chloride, vinyl fluoride, vinylidende chloride, vinylidene fluoride, tetrafluoroethylene, chlorotrifluoroethylene and mixtures thereof; vinyl esters such as vinyl acetate, and vinyl butyrate, vinyl aromatics such as styrene, alpha-methyl styrene, para-chloro styrene, parabromostyrene, 2, 4, dichlorostyrene, vinyl naphthalene, paramethoxystyrene, vinyl carbazole and mixtures thereof; unsaturated amides such as acrylamide, methacrylamide and mixtures thereof; unsaturated nitriles such as acrylonitrile, methacrylonitrile, haloacrylonitriles, phenylacrylonitrile, vinylidene cyanide and mixtures thereof; N-substituted unsaturated amides such as N, N-dimethyl acrylamide, N-methyl acrylamide and mixtures thereof; conjugated butadienes such as butadiene, isoprene and mixtures thereof; unsaturated ethers such as divinyl ether, diallyl ether, vinyl alkyl ether and mixtures thereof; unsaturated ketones such as divinyl ketone, vinyl alkyl ketone and mixtures thereof; unsaturated aldehydes and acetals such as acrolein and its acetals, methacrolein and its acetals, and mixtures thereof; unsaturated heterocyclic compounds such as vinyl pyridine, vinyl furan, vinyl coumarone, and mixtures thereof; unsaturated alicyclic compounds such as vinyl-cyclopentane, vinyl-cyclohexane and mixtures thereof; unsaturated thio compounds such as vinyl thioethers; unsaturated hydrocarbons such as ethylene, propylene, coumarone, indene, terpene, polymerizable hydrocarbon fractions, such as isobutylene and mixtures thereof; allyl compounds such as allyl alcohol, allyl esters, diallyl phthalate, triallylcyanurate and mixtures thereof; as well as condensation polymers including polyesters, such as linear, unsaturated and alkyd types made, for example, by reacting a difunctional acids or anhydrides such as phthalic, isophthalic, terephthalic, malic, maleic, citric, succinic, glutaric, adipic, tartaric, pimelic, suberic, azelaic, sebacic and camphoric with a polyol such as glycerin, ethylene, glycol, propylene glycol, sorbitol, mannitol, pentaerythritol, diethylene glycol and polyethylene glycol; polycarbonates such as bisphenol esters of carbonic acid; polyamides such as those made by reacting diamines with dibasic acids where the diamines contain from 2 to 10 carbon atoms and the acids contain from 2 to 18 carbon atoms; polyethers such as the epoxy type made, for example, by condensing epichlorohydrin with any one of bisphenol A, resorcinol, hydroquinone, ethylene glycol, glycerol, or other hydroxyl containing compounds; other polyethers made, for example, by reacting formaldehyde with difunctional glycols; polyurethanes prepared for example, by reacting a diisocyanate such as toluene-2, 4-diisocyanate; methylene bis(4-phenylisocyanate); bitolylene diisocyanate; 1,5-naphthalene diisocyanate, and hexamethylene diisocyanate with a dihydroxy compound; phenol aldehyde resins made, for example, by condensing resorcinol, phenol or cresols with formaldehyde, furfural or hexamethylene tetramine; urea formaldehyde, melamine formaldehyde; polythioethers; polysulfonamides; alkyl, aryl and alkaryl polysiloxanes etc. along with any suitable mixtures, copolymers or terpolymers of the above.

As stated above, the constituents of the polyblend of resins have distinctly different properties which are maintained even after the mixture is formed. The rheological properties of the individual materials are used to identify pairs of resins which are suitable for use together in the mixture. More specifically, the polyblend includes at least 10%, by weight, of a first resin having a second order glass transition temperature ($T_g$) of at least about 20°C. and at least 10%, by weight, of a second resin which has a ($T_g$) at least 5°C. lower than the first resin. Best results are achieved when one of the resins has a $T_g$ above about 55°C. and the other resin has a $T_g$ below about 38°C. and accordingly resin pairs with these properties are preferred. Since toners made up of the resin pairs oridinarilly do not encounter temperatures outside the 38°–55°C. range in the operating copying machines before they reach the fusing zone or in the pulverizing step of the manufacturing process one of the resins stays in the glassy state while the other remains in a rubbery state.

The glass transition temperatures of various polymers are readily available in the literature. In general, these temperatures are determined by measuring the dynamic modulus of each resin against its temperature and plotting the two. As most polymers are heated they first exist in a glassy state and the dynamic modulus remains fairly constant as temperature increases until it reaches the second order or glass transition temperature ($T_g$) where a sharp increase and peak occurs in the dynamic modulus. After this temperature is passed, the polymer exists in a rubbery condition at a lower dynamic modulus than the peak and stays at this level as the temperature is increased over another fairly wide range until it reaches the melting point or first order transition temperature ($T_m$) where a second and generally much larger peak occurs in the dynamic modulus. After this peak, the resin is in a viscous flow condition. Other tests for determining the glass transition temperatures of a polymer are known in the art, and a detailed description in this respect is not deemed necessary for a full understanding of the invention.

The resin with the higher $T_g$ stays glassy and makes for easy fracturing in manufacturing when the resin is subjected to very high impact, short duration forces in a jet pulverizer. The resin component with the lower $T_g$ on the other hand stays rubbery and makes the mixture tough and resistant to the long duration, lower energy shearing forces to which it is subjected during development in the machine and at the same time provides impact resistance to reduce resin filming on the drum and carrier beads. This component also prevents the toner particles from breaking up into very small dust fines under the long duration low impact forces in the machine. Thus, during formulation of the toner, the resin with the higher glass transition temperature provides the aforementioned desirable pulverization properties, and the resin with the lower glass transition temperature provides the aforementioned desirable blending properties.

Although a resin pair having any suitable $T_m$'s (first order transition temperatures) may be employed in carrying out the invention, a preferred system uses resins with $T_g$'s in the range described supra and $T_m$'s which are well separated. The higher of the two $T_m$'s may be very high but should generally be above 70°C. while the other $T_m$ should be as low as possible (preferably below about 50°C.). This prevents filming of the resin toners at intermediate temperatures but still allows for effective heat fusing.

The toner of the present invention is comprised of the resinous material and a pigment or dye in a quantity sufficient to impart color to the resin composition, generally in a quantity up to about 25%, by weight, and particularly from about 1% to about 20%, by weight, of the toner, whereby the resulting toner will form a clear visible image on a transfer member. Any of of a wide variety of pigments or dyes which do not adversely affect the properties of the toner may be employed to impart color to the resin; e.g., carbon black, a commercial red, blue or yellow dye, and since such dyes and/or pigments are well-known in the art, no detailed enumeration thereof is deemed necessary for a full understanding of the invention.

The colored toner may be prepared by any one of a wide variety of procedures for forming a uniform dispersion of the dye or pigment in the resinous material. Thus, for example, the resinous material and a suitable pigment may be heated and blended on a rubber mill and then allowed to cool and harden to encase the pigment within the resinous material. The pigmented or dyed resinous material is then micronized to particles having a particle size generally employed for a toner; generally a particle size of less than about 30 microns, preferably an average particle size from about 10 to about 20 microns.

The above procedure and other procedures for producing colored toner of the desired particle size are generally known in the art and may be employed for producing the toner of the present invention and, therefore, no detailed discussion thereof is necessary for a full understanding of the invention.

The hereinabove described toner of the invention formed from a polyblend may also include other materials generally employed for modifying the characteristics of a toner, such as, conductive materials to modify the triboelectric properties thereof, magnetic materials or the like, and the use of such materials is deemed to be within the scope of those skilled in the art from the teachings herein. Similarly, the toner may include a resinous component other than the hereinabove described polyblend, provided that a substantial portion of the resinous portion of the toner is comprised of the hereinabove described polyblend; generally the polyblend comprises from about 80% to about 100%, preferably from 90% to 100%, of the resinous portion of the toner. The remaining portion of the resinous component of the toner, if any, is generally a resin of the type employed to modify the physical properties of a toner material; e.g., a long chain thermoplastic which has little tendency toward agglomeration or cold flow, such as, polyvinyl butyral, polyethylene, shellac, waxes, polyesters, polyvinyl acetal, polyvinyl chloride, polyvinyl acetate and the like.

The toner hereinabove described, is employed in a developer composition by loosely coating the toner on a suitable electrostatographic developer carrier surface to which the toner is affixed by electrostatic attraction, as generally known in the art. Thus, for example, the toner composition may be employed in the cascade development technique, as more fully described in U.S. Pat. No. 2,618,551 to Walkup, U.S. Pat. No. 3,618,552 to Wise, and U.S. Pat. No. 2,638,416 to Walkup et al. In the cascade development technique, the developer composition is produced by mixing toner composition with a carrier, either electrically conducting or insulating, magnetic or non-magnetic, provided that the carrier material when brought in close contact with the toner composition acquires a charge having an opposite polarity to that of the toner whereby the toner adheres to and surrounds the carrier. Thus, the carrier material is selected in accordance with its triboelectric properties so that the toner is either above or below the carrier material in the triboelectric series, to provide a positively or negatively charged toner.

The carrier particles are larger than the toner particles by at least one order of magnitude of size and are shaped to roll across the latent image-bearing surface. In general, the carrier particles should be of sufficient size so that their gravitational or momentum force is greater than the force of attraction of the toner particles in the area of the image-bearing surface where the toner particles are retained, whereby the carrier will not be retained by the toner particles which are attracted to the image-bearing surface. The carrier particles generally have a particle size from about 30 to about 1000 microns, but it is to be understood, that the carrier particles may be of a size other than as particularly described, provided that the carrier flows easily over the image-bearing surface, without requiring special means for effecting removal of the carrier particles from the image-bearing surface.

The degree of contrast or other photographic qualities in the finished image may be varied by changing the relative proportions of toner and carrier material and the choice of optimum proportions is deemed to be within the scope of those skilled in the art. In general, however, the toner of the invention is employed in amounts to provide weight ratios of carrier to toner of from about 25:1 to about 250:1, preferably from about 75:1 to about 100:1, to produce a dense readily transferable image.

In addition to the use of particles to provide the carrier surface, the bristles of a fur brush may also be used. Here also, the toner particles acquire an electrostatic charge of polarity determined by the relative position of the toner particles and the fur fibers in the triboelectric series. The toner particles form a coating on the bristles of the fur clinging thereto by reason of the electrostatic attraction between the toner and the fur just as the toner clings to the surface of the carrier particles. The general process of fur brush development is described in greater detail in U.S. Pat. No. 3,251,706 to L. E. Walkup.

Even more closely related to the cascade carrier development is magnetic brush development. In this process, a carrier is selected having ferromagnetic properties and selected relative to the toner in a triboelectric series so as to impart the desired electrostatic polarity to the toner and carrier as in cascade carrier development. On inserting a magnet into such a mixture of toner and magnetic material the carrier particles align themselves along the lines of force of the magnet to assume a brush-like array. The toner particles are electrostatically coated on the surface of the powder carrier particles. Development proceeds as in regular cascade carrier development on moving the magnet over the surface bearing the electrostatic image so that the "bristles" of the magnetic brush contact the electrostatic image-bearing surface.

Still another method of carrier development is known as sheet carrier development in which the toner particles are placed on a sheet as of paper, plastic, or metal. This process is described in U.S. Pat. No. 2,895,847 to C. R. Mayo. As described therein the electrostatic attraction between the sheet surface and toner particles necessary to assure electrostatic attraction therebetween may be obtained by leading the sheet through a mass of electroscopic toner particles whereby there is obtained a rubbing or sliding contact between the sheet and the toner. In general it is desirable to spray the surface of the sheet bearing the electroscopic toner particles with ions of the desired polarity as by the use of a corona charging device as described in the patent of Mayo.

The resulting image of toner particles of the image-bearing surface may then be transferred to a suitable transfer member to form the final copy. The transfer of the toner particles may be effected adhesively or electrostatically and the resulting image on the transfer member is made permanent, for example, by heating the toner particles to a temperature at which the resinous composition of the toner is fused, or by contact with a solvent, as known in the art.

The toner as should be apparent from the hereinabove teachings, may be employed in a wide variety of developer compositions by electrostatically coating the toner composition to a suitable carrier surface, which is subsequently passed over a latent imate-bearing surface. The toner of the invention may also be employed for developing latent-electrostatic image formed by other than electrophotographic means; for example, the development of latent-electrostatic images formed by pulsing electrodes as employed in electrostatic printing processes. In addition, the toner of the invention may be employed for developing a latent electrostatic image on a surface other than a photoconductive insulating surface. Therefore, the overall invention is not limited to a specific technique for forming or developing a latent-electrostatic image or to a specific carrier for the toner.

The following illustrative examples of embodiments of the invention are given to enable those skilled in the art to more clearly understand and practice the invention with the understanding that these are exemplary only and are not intended in any way to limit the scope of the invention. Unless otherwise indicated, all parts and percentages are taken by weight.

EXAMPLE I

Two-hundred grams of a polycarbonate resin made by phosgenation of bisphenol A is dissolved in 7178 grams of trichloroethylene and 22.2 grams of Molocco H carbon black particles are dispersed in this solution. The dispersion is then spray dried with a spinning disc atomizer at a feed rate of 110 ml per minute, a nozzle pressure of about 35 psi. and a drying air temperature of about 115°F. to produce a fine black powder. This production techinque is employed because attempts to produce toner from the polycarbonate resin in conventional pulverizing equipment is futile owing to its extreme toughness. The toner produced by the spray drying technique is tested in an 813 office copier and proves to be very tough and resistant to the formation of dust fines and/or film on either the xerographic drum in the machine or the carrier beads in the developer mix. However, the fuser in the machine which provides a fusing temperature of about 275°–300°F. proves inadequate to heat fuse to the paper to which the toner image is transferred. Since the polycarbonate does not melt until it reaches 230°C. the toner cannot be heat fused without setting the paper afire.

EXAMPLE 2

One-hundred and fifty grams of POLYMID — 1060 (a polyamide resin available from the KRUMPHAAR resin division of LAWTER Chemicals Inc.) is heated and blended on a rubber mill with 16.7 grams of Molocco H carbon black of the type used in Example 1. After completion of the blending, the resin is allowed to cool, broken up in a Fitz mill and finally jet-pulverized down to a very fine particle size. The toner pulverizes easily even when it is fed into the pulverizer at a relatively high feed rate. The thus produced developer is then tested in an 813 office copier according to the testing procedure used in Example 1. Although the copies are very well fused, there is some graininess and loss of resolution visible after about 200 copies apparently due to particle growth by agglomeration in the machine and visible inspection of the drum and carrier beads after a 2000 copy uninterrupted run indicate the formation of a film on the drum and impacted toner particles on the carrier beads.

EXAMPLE 3

133.2 grams of the polycarbonate resin of Example 1 and 66.6 grams of the polyamide resin of Example 2 are both dissolved together in 1000 grams of cyclohexanone, and the solution is vigorously agitated. After the solvent is evaporated off, the resulting polyblend is heated and blended on a rubber mill with 22.2 grams of the Molocco H carbon black. After cooling, the polymer is broken up in a Fitz mill and jet-pulverized to make fine toner particles. Good pulverization is achieved in conventional equipment at a rapid feed rate. The polycarbonate resin has a $T_g$ of 150°C. and a $T_m$ of 230°C. while the polyamide resin has a $T_g$ of 55°C. and a $T_m$ of 105°C. Testing in an 813 copier provides well fused prints and no filming of the xerographic drum or carrier beads nor dust formation nor toner agglomeration is found to occur in the machine even after 2000 copies are run off on it.

EXAMPLES 4–8

In Examples 4–8, toners are made up containing the following resins: In Example 4, a waxy low molecular weight polyhexamethylene sebacate resin (M.W. about 3000) having a $T_g$ of −50°C. and a $T_m$ of 69°C. is employed. In Example 5, an extremely tough and infusible phenoxy resin having a $T_g$ of 50°C. and a $T_m$ of 90°C. is employed, and in Examples 6–8, blends of these resins at the ratios of 80/20, 60/40, 35/65, by weight, of the phenoxy resin of Example 5 to the hexamethylene sebacate resin of Example 4 are employed. The phenoxy resin employed is Grade PKDA 8500 available from Union Carbide and Carbon Corporation. An attempt to make the polyhexamethylene sebacate toner by rubber milling the heated resin with 1 part by weight of carbon black to each 9 parts by weight of resin, cooling and pulverizing according to the same technique used in Example 2 above fails because of the very sharp melting point of the resin. It is therefore spray dried. Attempts to employ this technique with the phenoxy resin toner of Example 5 are also unavailing owing to the extreme toughness of this material and it is accordingly made up by spray drying a suspension of 20.8 grams of Molocco H carbon black in a solution of 194.4 grams of the phenoxy resin in a mixed solvent of 800 grams butanol, 9100 grams toluene and 600 grams methyl ethyl ketone. The mixed resin toners of Examples 6–8 are made up by dissolving the proper ratios of each resin in a mixed solvent in an amount of 10 parts of solvent to each one part of mixed resin. The solvent employed is a 10/1/1 mixture of toluene, butanol, and methyl ethyl ketone. When these solutions are made up, they are vigorously agitated for 2 hours and the solvent is dried off yielding a mixed solid resin which is then heated and blended on a rubber mill with one part of Molocco H carbon black to each 9 parts of resin. After cooling, the carbon black-resin mixture is broken up in a Fitz mill and then jet-pulverized to make the final toner particles. Although the material of Example 4 can be passed through the jet pulverizer at an extremely fast rate to further reduce particle size the materials of Examples 6–8 can also be passed through the pulverizer at average pulverizing rates, with the Example 6 material passing through at a slightly slower rate than average and Example 8 material at a slightly faster rate than average. After all materials are completed, they are tested in a xerographic copier of the type employed for testing in Examples 1–3. The Example 4 material produces good quality prints which seem to be very well fused to the copy paper, however, after 50 copies are made a certain graineness is seen to appear in the prints and a check of the drum and carrier beads indicates that both are heavily filmed. The toner of Example 5 is similarly tested; however in view of the high melting point, it cannot be fused in the machine. The toners of Examples 6–8 are also tested according to the same procedure and each one is found to produce sharp well-fused prints. Examination of the carrier beads and the drum at intervals during a long copying run show no sign of film formation on either the carrier beads or the drum.

EXAMPLES 9–11

A styrene-acrylonitrile copolymer is dissolved in methyl ethyl ketone at the rate of 90 grams of resin to 1900 grams of solvent. After the dispersion of 10 grams of Molocco H carbon black in this solution, the dispersion is spray dried to form a very fine toner particle. A prior attempt to rubber mill the pigment into the copolymer shows that the resin is too tough and has too high a melting point for rubber milling on available conventional equipment. The toner, for Example 10 is fabricated by rubber milling 90 parts by weight of heated AYAS resin (a polyvinyl acetate resin available from Union Carbide) ($T_g$ 30°C. $T_m$ 53°C.) with 10 parts by weight of Molocco H carbon black. This blend is then easily pulverized according to the procedure of Example 2. The toner particles of Example 11 are formed by dissolving 90 grams of the styrene-acrylonitrile copolymer ($T_g$ 52°C., $T_m$ 110°C.) of Example 9 and 10 grams of the polyvinyl acetate resin of Example 10 in 575 grams of a 50/50 toluene/methyl ethyl ketone solvent and agitating vigorously for two hours. After resin mixing is complete, the solvent is evaporated off and the dry resin is heated and rubber milled with 10 parts by weight of carbon black to each 90 parts by weight of resin. After cooling, the blended resin and carbon black is broken up in a Fitz mill and then fine pulverized in a jet pulverizer which is fed at a high rate, to produce uniform fine toner particles. All three toners are tested in a xerographic copier according to the procedures of Examples 1–3. The Example 9 toner does not fuse in the machine. The Example 10 toner while fusing very well is extremely soft and produces a heavy deposit of film both on the carrier beads and the drum while the toner of Example 11 is readily fused and shows no evidence of filming on either the toner of the drum even after 2000 copy cycles.

EXAMPLES 12–20

In each of these Examples, the following resins together with 10% by weight of carbon black are employed in producing the toners.

10% carbon black over a ½-hour period so as to blend both the carbon black and the two resins into the final composition. This is then also followed by Fitz milling and jet pulverization. Attempts to rubber mill and jet-pulverize the toners produced with the resins of Examples 12, 14 and 19 are very difficult or entirely futile owing to the high melting point and extreme toughness of these materials. After manufacture, each of the toners of Examples 12–20 is tested in a xerographic copier as described above in connection with Examples 1–3. The toners of Examples 12, 14 and 19 prove to be very tough in the machine and neither break up nor form films on either the carrier beads or the xerographic drum even after extensive use; however, the developed toner images are not well fixed to the paper by the heat fuser. The toners of Examples 13, 16, 17 and 20 while still appearing to be tough under machine use and not prone either to breaking up to dust fines in the machine or to filming on carrier beads or drum surface produce well fused high quality prints. The toner of Example 15 made from a soft relatively low molecular weight low melting point natural resin pulverizes readily and fuses very well on the final copy paper when it is tested in a xerographic copier, however very heavy filming is evident on the xerographic drum and the carrier beads

| EXAMPLE NO. | RESIN | $T_g$ (GLASS TRANSITION TEMPERATURE | $T_m$ (MELTING TEMPERATURE) |
|---|---|---|---|
| 12 | polyvinyl-butyral | 63°C. | 99°C. |
| 13 | 10% polyvinyl-butyral 90% polyamide | Blend of Examples 12 and 2 | |
| 14 | polymethyl-methacrylate | 100°C. | 155°C. |
| 15 | *PENTALYN H Resin | 66°C. | 82°C. |
| 16 | 90% polymethyl-methacrylate 10% PENTALYN H | Blend of Examples 14 and 15 | |
| 17 | 80% polymethyl methacrylate 20% polyvinyl acetate | Blend of Examples 10 and 14 | |
| 18 | " | " | " |
| 19 | phenolformaldehyde | 95°C. | 128°C. |
| 20 | 66% phenolformaldehyde + 33% hexamethylene sebacate | Blend of Examples 19 and 4 | |

The resin blend of Example 13 is made by blending the two resins in a 2/1 ratio of toluene to isopropyl alcohol and agitating for 2 hours, followed by solvent removal. The same procedure is employed to blend the resins of Examples 16, 17 and 20.

Pentalyn H is a modified natural resin made by esterifying 50% hydrogenated rosin with pentaerythritol. The CKM phenol formaldehyde resin of Example 19 is a very tough "B" stage thermosetting resin. The tougher resins of Examples 12, 14 and 19 are fabricated into toner particles by blending carbon black into a solution of the resin and spray drying the resulting dispersion. All of the other toners are produced by rubber milling to blend the carbon black into the heated resin followed by Fitz milling for rough pulverization and jet-pulverizing the resulting product to yield the final toner particle. The resin of Example 18 is the exception to this procedure since in this case the two resins are heated well above their individual glass transition temperatures and rubber milled together with when this material is employed and some agglomeration apparently occurs in the machine as evidenced by large black spots on the copy after a few hundred cycles. The toner of Example 18 which is identical with that of Example 16, except for the fact that the resins are blended on a rubber mill rather than in solution, is characterized by a very much wider particle size distribution than that which is achieved by pulverization of the polyblend produced as in Example 17. In addition, when the toner of Example 18 is tested in a xerographic copier, filming of the drum and carrier beads and toner particle agglomeration is evident, apparently because some of the toner particles are made up almost exclusively of the softer resin.

EXAMPLE 21

A graft copolymer having a backbone of poly(ethyl acrylate) ($T_g$ —24°C.) and a graft of polystyrene ($T_g$ 100°C.), comprised of 30% of the backbone polymer and 70% of the graft, all by weight, is prepared by the procedure described in British Patent 926,142.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 22

A graft copolymer having a backbone of poly (t-butyl acrylate) ($T_g$. −22°C.) and a graft of polystyrene, comprised of 20% of the backbone polymer and 80% of the graft, all by weight, is prepared by the procedure disclosed in British Patent 926,142.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 23

A graft copolymer having a backbone of poly (2-ethyl hexyl acrylate) ($T_g$. −50°C.) and a graft of polystyrene comprised of 30% of the backbone polymer and 70% of the graft, all by weight, is prepared by the procedure disclosed in British Patent 926,142.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 24

A graft copolymer having a backbone of poly (ethyl acrylate) and a graft of poly (4-methoxystyrene) ($T_g$. 89°C.), comprised of 30% of the backbone polymer and 70% of the graft, all by weight, is prepared by the procedure disclosed in British Patent 926,142.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 25

A graft copolymer having a backbone of poly (vinyl acetate) ($T_g$. 28°C.) and a graft of poly (methyl methacrylate) ($T_g$. 105°C.), comprised of 40% of the backbone polymer and 60% of the graft, all by weight, is prepared by the procedure disclosed in U.S. Pat. No. 3,083,172.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 26

A graft copolymer having a backbone of poly (vinyl acetate) and a graft of poly (isopropyl methacrylate) $T_g$. 81°C.) comprised of 30% of the backbone polymer and 70% of the graft, all by weight, is prepared by the procedure disclosed in U.S. Pat. No. 3,083,172.

The graft copolymer is rubber milled with carbon black to provide a blend comprised of 10% carbon black and 90% of the graft copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low backround.

EXAMPLE 27

A block copolymer of the A-B-A type wherein A is poly (n-butyl methacrylate) ($T_g$. 20°C.) and B is polystyrene, comprised of 70% of polystyrene and 30% poly (n-butyl methacrylate), all by weight, is prepared by the procedure disclosed by Bamford and Jenkins, *Nature* Vol. 176 Page 78 (1955).

The block copolymer is rubber milled with carbon black to provide a blend comprised of 10% carbon black and 90% of the block copolymer, all by weight.

The blend is rough pulverized on a Fitz mill, followed by jet pulverization to a fine particle size.

The blend is employed as a toner by combining the blend with an electrostatographic developer comprised of 250 micron steel beads coated with styrene-methyl methacrylate-vinyl triethoxysilane polymer, to provide a developer composition comprised of 1 part toner and 100 parts carrier.

The developer composition is cascaded (3 cycle) over a flat selenium plate, bearing a latent electrostatic image, and the deposited toner electrostatically transferred to paper, whereon the toner is fixed to produce a print of good density and low backround.

EXAMPLE 28

A block copolymer of the A-B type wherein A is polyacrylonitrile ($T_g$. 105°C.) and B is poly (n-butyl methacrylate), comprised of 80% of polyacrylonitrile and 20% of poly (n-butyl methacrylate), all by weight, is prepared by the procedure disclosed by Bamford and White, *Trans. Far. Soc.* Vol. 52 Page 716 (1956).

The block copolymer is rubber milled with carbon black to provide a blend comprised of 10% carbon black and 90% of the block copolymer, all by weight.

The blend is rough pulverized on a Fitz mill, followed by jet pulverization to a fine particle size.

The blend is employed as a toner by combining the blend with an electrostatographic developer carrier comprised of 250 micron steel beads coated with styrene-methyl methacrylate-vinyl triethoxysilane polymer, to provide a developer composition comprised of 1 part toner and 100 parts carrier.

The developer composition is cascaded (3 cycles) over a flat selenium plate, bearing a latent electrostatic image, and the deposited toner electrostatically transferred to paper, whereon the toner is fixed to produce a print of good density and low background.

The toners of the present invention, which are prepared from the hereinabove described polyblends, are different than those toners heretofore produced in the art by physically milling two polymers in that both the physical and chemical polyblends of the present invention are an extremely uniform blend of the polymeric components, of the type generally achieved by forming solid polymer solutions, except that unlike solid polymer solutions, each polymeric component individually contributes its respective properties. Thus, the polyblends of the present invention possess the primary advantageous property of a solid blend of compatible polymers; i.e., uniformity, without also possessing an average set of properties of the components of the blend, as would result from producing a blend of compatible polymers. Thus, the toner particles of the present invention, as a result of the uniformity of the polyblend from which they are formed, unlike prior art toners which include a milled mixture of polymers, incorporate the hereinabove described properties of each of the polymeric components. The toners of the present invention are therefore easily formulated, and as hereinabove described, effectively develop latent electrostatic images.

It is, of course, to be understood that the foregoing examples are only exemplary of the invention and that other suitable materials and manufacturing techniques may be employed in carrying out the invention. It is also to be understood that manufacturing process modifications and/or additions and/or material additives may be employed in carrying out the invention to improve or synergize the electrical properties, fusing properties and other desirable properties of the resulting toners. The toners of the invention may be used in any electrostatographic technique for which they are suitable. In addition, to their use in the xerographic process as described above, they may also be employed in other electrostatographic systems which employ the lines of force from an electric field to control the deposition of finely divided marking material or toner on an imaging surface. Some illustrative electrostatographic techniques of this type are described, for example, in U.S. Pat. Nos. 2,576,047 to Schaffert, 3,064,259 to Schwertz and 3,081,698 to Childress as well as U.S. Pat. Nos. 3,220,831 and 3,220,833.

Numerous modifications and variations of the present invention are possible in light of the above teachings and, therefore, within the scope of the appended claims, the invention may be practised in a manner other than as particularly described.

What is claimed is:

1. Finely-divided electrostatographic dry toner particles consisting essentially of a resinous material and from 1 (up) to about 25% of a colorant selected from the group consisting of dyes, pigments, and mixtures thereof based on the weight of said toner particles, said resinous material consisting essentially of a polyblend of at least 10% by weight of a first polymer having a glass transition temperature of at least about 20°C and at least 10% by weight of a second polymer having a glass transition temperature of at least about 5°C lower than the glass transition temperature of said first polymer, said polyblend consisting essentially of (comprising) a block copolymer of said first and second polymers.

2. The toner as defined in claim 1 wherein said first polymer is selected from the group consisting of carbonate polymers, polymers of vinyl butyral, phenoxy polymers, styrene polymers, acrylonitrile polymers, phenol-formaldehyde polymers, methacrylate polymers, and urethane polymers.

3. The toner as defined in claim 1 wherein said second polymer is selected from the group consisting of polymers of vinyl acetate, acrylate polymers, methacrylate polymers, amide polymers, and ester polymers.

4. The toner as defined in claim 1 wherein said first polymer is selected from the group consisting of carbonate polymers, polymers of vinyl butyral, phenoxy polymers, styrene polymers, acrylonitrile polymers, phenol-formaldehyde polymers, methacrylate polymers, and urethane polymers; and said second polymer is selected from the group consisting of polymers of vinyl acetate, acrylate polymers, methacrylate polymers, amide polymers, and ester polymers.

5. The toner as defined in claim 1 wherein said block copolymer is of the A-B-A type wherein A is a poly(n-butyl methacrylate) (Tg 20°C) and B is a polystyrene comprising 70% of polystyrene and 30% poly(n-butyl methacrylate).

6. The toner as defined in claim 1 further comprising a particulate electrostatographic carrier, said carrier being larger than said toner particles by at least 1 order of magnitude of size.

* * * * *